(12) United States Patent
Nakamata

(10) Patent No.: US 7,711,365 B2  
(45) Date of Patent: May 4, 2010

(54) APPARATUS, METHOD AND COMPUTER PROGRAM PRODUCT PROVIDING FOR RELEASE, CONFIGURATION AND RECONFIGURATION OF E-RGCH/E-HICH AT A SERVING CELL CHANGE

(75) Inventor: Masatoshi Nakamata, Kanagawa (JP)

(73) Assignee: Nokia Corporation, Espoo (FI)

( * ) Notice: Subject to any disclaimer, the term of this patent is extended or adjusted under 35 U.S.C. 154(b) by 816 days.

(21) Appl. No.: 11/506,671

(22) Filed: Aug. 18, 2006

(65) Prior Publication Data

US 2007/0042785 A1 Feb. 22, 2007

Related U.S. Application Data

(60) Provisional application No. 60/710,701, filed on Aug. 22, 2005, provisional application No. 60/719,903, filed on Sep. 22, 2005.

(51) Int. Cl.  
*H04W 36/00* (2009.01)  
*H04W 4/00* (2009.01)

(52) U.S. Cl. ..................... 455/437; 370/329

(58) Field of Classification Search ......... 455/436–442; 370/338  
See application file for complete search history.

(56) References Cited

U.S. PATENT DOCUMENTS

| 2005/0265301 | A1 | 12/2005 | Heo et al. .................... 370/349 |
| 2006/0056355 | A1* | 3/2006 | Love et al. .................. 370/332 |
| 2006/0120408 | A1* | 6/2006 | Willenegger ................ 370/508 |
| 2007/0025300 | A1* | 2/2007 | Terry et al. .................. 370/335 |
| 2009/0093243 | A1* | 4/2009 | Lee et al. ..................... 455/418 |

FOREIGN PATENT DOCUMENTS

| EP | 1705944 A1 | 9/2006 |
| KR | 2005-0081567- | 8/2005 |
| WO | WO2006-036346 A1 | 4/2006 |
| WO | WO2006-077141 A1 | 7/2006 |

OTHER PUBLICATIONS

Universal Mobile Telecommunications System (UMTS); FDD enhanced uplink; Overall description; Stage 2 (3GPP TS 25.309 version 6.1.0 Release 6) ETSI TS 125 309.  
Feasibility study for enhanced uplink for UTRA FDD (Release 6 3GPP TR 25.896 IDT.123XP PUB—3GPP TR 25.896 V6.0.0 XP002322111 PD—2004-03-00) sections 8.1-9.76.  
"$3^{rd}$ Generation Partnership Project; Technical Specification Group Radio Access Network; URTRAN Iub interface Node B Application Part (NBAP) signalling (Release 6)", 3GPP TS 25.433 V6.6.0, 2005-2006, 22 pages.

* cited by examiner

*Primary Examiner*—Vincent P. Harper  
*Assistant Examiner*—Omoniyi A Obayanju  
(74) *Attorney, Agent, or Firm*—Harrington & Smith (57) ABSTRACT

Communications are received from a user equipment UE on an uplink enhanced dedicated channel E-DCH. The radio resources of at least one downlink channel that supports the E-DCH are either released or configured or reconfigured while the E-DCH is maintained for the UE. The downlink channels may be E-AGCH, E-HICH, or E-RGCH, and the radio resources may include a temporary identifier E-RNTI, signature sequence, and/or channelization codes. At a serving cell change of the UE, either or both of the serving cell and the non-serving cell can add/configure/reconfigure a supporting downlink channel, all without terminating the E-DCH. The UE and the SRNC are notified by an E-RGCH release indicator whether the E-RGCH is released or not at a serving cell change, and the UE deletes its stored E-RGCH parameters when the release indicator indicates it is released.

32 Claims, 6 Drawing Sheets

FIG.1

9.1.43 RADIO LINK RECONFIGURATION READY

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE DISCRIMINATOR | M | | 9.2.1.45 | | – | |
| MESSAGE TYPE | M | | 9.2.1.46 | | YES | REJECT |
| TRANSACTION ID | M | | 9.2.1.62 | | – | |
| CRNC COMMUNICATION CONTEXT ID | M | | 9.2.1.18 | THE RESERVED VALUE "ALL CRNCCC" SHALL NOT BE USED | YES | IGNORE |
| RL INFORMATION RESPONSE | | 0..<maxno ofRLs> | | | EACH | IGNORE |
| >RL ID | M | | 9.2.1.53 | | – | |
| >DCH INFORMATION RESPONSE | O | | 9.2.1.20C | | YES | IGNORE |
| >DSCH INFORMATION RESPONSE | O | | 9.2.1.27A | | YES | IGNORE |
| >USCH INFORMATION RESPONSE | O | | 9.2.3.29 | TDD ONLY | YES | IGNORE |

FIG.2A

| FIG.2A |
|---|
| FIG.2B |

FIG.2

| | | | | |
|---|---|---|---|---|
| >TFC12 BEARER INFORMATION RESPONSE | 0 | 9.2.2.49A | FDD ONLY. THERE SHALL BE ONLY ONE TFC12 BEARER PER NODE B COMMUNICATION CONTEXT | – |
| >DL POWER BALANCING UPDATED INDICATOR | 0 | 9.2.2.12D | | YES | IGNORE |
| >E-DCH RL SET ID | 0 | RL SET ID 9.2.2.39 | | YES | IGNORE |
| >E-DCH FDD DL CONTROL CHANNEL INFORMATION | 0 | 9.2.2.13Dc | | YES | IGNORE |
| >E-RGCH RELEASE INDICATOR —100 | 0 | 9.2.1.xx | FDD ONLY | YES | IGNORE |
| CRITICALITY DIAGNOSTICS | 0 | 9.2.1.17 | | YES | IGNORE |
| TARGET COMMUNICATION CONTROL PORT ID | 0 | COMMUNICATION CONTROL PORT ID 9.2.1.15 | | YES | IGNORE |
| HS-DSCH FDD INFORMATION RESPONSE | 0 | 9.2.2.18E | FDD ONLY | YES | IGNORE |
| HS-DSCH TDD INFORMATION RESPONSE | 0 | 9.2.3.5G | TDD ONLY | YES | IGNORE |
| E-DCH FDD INFORMATION RESPONSE | 0 | 9.2.2.13Db | | YES | IGNORE |

APPARATUS, METHOD AND COMPUTER PROGRAM PRODUCT PROVIDING FOR RELEASE, CONFIGURATION AND RECONFIGURATION OF E-RGCH/E-HICH AT A SERVING CELL CHANGE

CROSS-REFERENCE TO RELATED APPLICATIONS

This application claims the benefit of U.S. Provisional Application No. 60/710,701, filed Aug. 22, 2005; and of U.S. Provisional Application No. 60/719,903, filed Sep. 22, 2005. Both of those applications, including an Exhibit A attached to each, are incorporated herein by reference.

TECHNICAL FIELD

The exemplary and non-limiting embodiments of this invention relate generally to wireless communications systems and, more specifically, relate to methods and apparatus that provide packet data transfer capabilities in a digital wireless communications system.

BACKGROUND

The following abbreviations that appear in the ensuing description are defined as follows:
3GPP Third Generation Partnership Project
DCH Dedicated Channel
DL Downlink (Node B to UE)
E-AGCH E-DCH Absolute Grant Channel
E-DCH Enhanced DCH
E-HICH E-DCH HARQ Acknowledgment Indicator Channel
E-RGCH E-DCH Relative Grant Channel
E-RNTI E-DCH Radio Network Temporary Identifier
HARQ Hybrid Automatic Repeat reQuest
HSUPA High Speed Uplink Packet Access
IE Information Element
NBAP Node B Application Protocol
Node B Base station
RNC Radio Network Controller
RNSAP Radio Network Subsystem Application Protocol
RRC Radio Resource Control
SRNC Serving RNC
RL Radio Link
RoT Rise over Thermal
UE User Equipment
UL Uplink (UE to Node B)
VoIP Voice over Internet Protocol For 3GPP it has been agreed that there are to be two scheduling methods. These are an Absolute Grant method that uses E-AGCH, and a Relative Grant method that uses E-RGCH. The E-AGCH is a shared downlink channel that is used to provide an absolute limitation on the amount of uplink resources the UE may use for the E-DCH, scheduling how much data the UE can send (data rate) and maximum power. The E-RGCH complements the E-AGCH, and is used to increase or decrease the scheduled rate and/or power the UE sends on the E-DCH as compared to the previous value granted (e.g., granted over the E-AGCH or by a previous command over the E-RGCH). The E-AGCH is sent from only one cell, referred to as the E-DCH serving cell. The E-RGCH may be sent from each cell in an E-DCH Active Set, i.e., E-RGCH is not mandated to be sent from all cells in the E-DCH Active Set. It is left to the Node B implementation for configuring the E-RGCH resource for the UE. The E-HICH is the Hybrid Automatic Repeat Request (HARQ) channel, a physical channel used by the HARQ process to acknowledge transmissions from the user equipment on the E-DCH. The makes the uplink more resilient to signal errors by allowing retransmissions of faulty packets, as requested by the Node B by acknowledgements or negative acknowledgements.

Respecting the E-RGCH, there can be a serving relative grant and a non-serving relative grant on that shared physical channel. Transmitted on the downlink E-RGCH, the serving relative grant is from any cell in the serving E-DCH RL service, and allows the Node B to adjust the granted rate of UE's under its control. Typically, the command for the serving relative grant is "UP", "DOWN", or "HOLD". Also transmitted on the downlink E-RGCH is the non-serving relative grant. This allows neighboring Node B's to adjust the transmitting rate of UE's not under its control (e.g., in neighboring cells under control of the serving Node B) in order to avoid overload situations. Typically, the command for the non-serving relative grant is either "HOLD" or "DOWN". Multiple non-serving relative grants can be sent to a UE at one time (since there may be multiple neighboring cells under control of different non-serving Node B's), whereas by definition there may be only one serving relative grant sent to a UE at any one time (from its serving cell as scheduled by the serving Node B).

In the current specification the E-RGCH is configured only when the E-DCH is setup, and there is no technique specified to release, configure and reconfigure the E-RGCH in the Node B after the setup of E-DCH, i.e., the Node B is required to use the same E-RGCH configuration until the E-DCH is released, or until the RL is deleted. Conversely, in the case that the Node B does not configure the E-RGCH at E-DCH setup, the Node B will not have the E-RGCH until the E-DCH is released.

As the E-DCH concept is a new feature for 3GPP, prior to this invention there were no satisfactory solutions to the foregoing problems.

SUMMARY

The foregoing and other problems are overcome, and other advantages are realized, in accordance with the presently described embodiments of these teachings.

In accordance with an exemplary embodiment of the invention, there is provided a method for managing radio resources in a wireless network. In the method, communications are received from a user equipment UE on an uplink enhanced dedicated channel E-DCH. Then, radio resources of at least one downlink channel that supports the E-DCH are either released, configured or reconfigured while the E-DCH is maintained for the UE.

In accordance with another exemplary embodiment of the invention, there is provided a program of machine-readable instructions, tangibly embodied on an information bearing medium and executable by a digital data processor, to perform actions directed toward reconfiguring control of a channel. The actions include receiving communications from a user equipment UE on an uplink enhanced dedicated channel E-DCH, and for at least one downlink channel that supports the E-DCH, one of releasing or configuring or reconfiguring radio resources of the at least one downlink channel while the E-DCH is maintained for the UE.

In accordance with another exemplary embodiment of the invention, there is provided a network element that includes a transceiver, a memory, and a data processor coupled to the memory and to the transceiver. The data processor as coupled operates to release, reconfigure, or configure radio resources of at least one downlink channel that supports an enhanced dedicated channel E-DCH for a user equipment UE without terminating the E-DCH. The data processor further operates to signal the releasing, configuring, or reconfiguring of the radio resources to one of a higher network element or to the UE.

In accordance with an exemplary embodiment of the invention, there is provided a mobile station that includes a transceiver, a memory, and a data processor coupled to the memory and to the transceiver. The transceiver, which may be one or more, is for transmitting data on an enhanced dedicated channel E-DCH and for receiving a first and a second message. The first message includes configuration parameters for at least one downlink channel that supports the E-DCH. The second message includes an instruction to cancel, change or add to the configuration parameters. The memory is for storing the configuration parameters. After receipt by the mobile station of the first message, the data processor is for configuring the transceiver to receive the at least one downlink channel according to the configuration parameters of the first message. After receipt by the mobile station of the second message, the data processor is for changing the stored configuration parameters according to the instruction, and also for re-configuring the transceiver to receive the at least one downlink channel according to the changed configuration parameters while maintaining the uplink E-DCH for the mobile station.

In accordance with another embodiment is a method for operating a network Node B. In this method, the Node B receives from a serving radio network controller SRNC a RADIO LINK RECONFIGURATION PREPARE message that relates to a serving cell change that involves the Node B and a user equipment UE. Responsive to receiving the PREPARE message, the Node B sends to the SRNC a RADIO LINK RECONFIGURATION READY message. In the method the Node B also receives from the SRNC a RADIO LINK RECONFIGURATION REQUEST message that is related to the serving cell change. Responsive to that REQUEST message, the Node B sends to the SRNC a RADIO LINK RECONFIGURATION RESPONSE message. At least one of the READY message and the RESPONSE message includes an information element E-RGCH RELEASE INDICATOR, which is indicative of whether an enhanced relative grant channel E-RGCH is released or not released. The Node B releases, configures, or reconfigures the E-RGCH in accordance with the RADIO LINK RECONFIGURATION RESPONSE message while maintaining an enhanced dedicated channel E-DCH for the UE.

In accordance with another embodiment, a network element includes means for receiving data from a user equipment UE over a dedicated traffic channel (such as for example a receiver), means for sending control messages to the UE over a downlink channel associated with the dedicated traffic channel (such as for example a transmitter. The network element further includes means for releasing or reconfiguring the downlink control channel, or for configuring an additional downlink control channel; either of which is without terminating the dedicated traffic channel. An example of the means for releasing/reconfiguring/configuring is a processor coupled to a computer program stored on a memory and coupled to the transmitter. The network element further includes means for communicating said releasing, reconfiguring, or configuring to the UE (such as for example the transmitter).

Further details as to these and other embodiments, implementations and variations are detailed below.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

The inventor has realized that the above-described proposed scheduling implementations noted in the Background section may generate the following problems during and after a serving cell change by the UE.

1) In the case where the serving cell does not have the E-RGCH, and when it becomes a non-serving cell, the Node B, which the cell belongs to, would desire to configure the E-RGCH in order to reduce the RoT in the cell (RoT indicates the ratio between the total power received from wireless sources at a Node B and the thermal noise, and is known in the art). However, it is not possible to configure the E-RGCH, and thus the Node B cannot reduce the RoT generated by the UE in the cell.

2) In the case where the serving cell has the E-RGCH, and when it becomes a non-serving cell, the Node B, which the cell belongs to, would desire to release the E-RGCH since the Node B does not support E-RGCH from the non-serving RL set. However, it is not possible to release the E-RGCH in this case, as the E-RGCH resource (code and signature sequence) must be reserved even if the E-RGCH is never sent to the UE.

3) In the case where the serving cell has the E-RGCH, and when it becomes the non-serving cell, the Node B, which the cell belongs to, would desire to reconfigure the E-RGCH from a "dedicated E-RGCH" condition, which code/signature sequence is allocated to one UE only, to a "common E-RGCH" condition, where the code/signature sequence is allocated to multiple UEs. However, it is not possible to configure the E-RGCH in this case, as the Node B must send a "dedicated" E-RGCH (overload indicator) for reducing the RoT, which is a waste of the E-RGCH resource and the DL radio resource.

4) In the case where the non-serving cell does not have the E-RGCH, and when it becomes the serving cell, the Node B, which the cell belongs to, would desire to have the E-RGCH that complements the E-AGCH in the serving Node B. However, it is not possible to configure E-RGCH in this case as the Node B must always use the E-AGCH, even if it supports E-RGCH from the serving RLS.

5) In the case where the non-serving cell has the E-RGCH, and when it becomes the serving cell, the Node B, which the cell belongs to, would desire to release E-RGCH. However, it is not possible to release the E-RGCH in this case as the E-RGCH resource must be reserved, even if the E-RGCH is never sent to the UE.

6) In case where the non-serving cell has the E-RGCH, and when it becomes the serving cell, the Node B, which the cell belongs to, would desire to reconfigure the E-RGCH from the "common E-RGCH" to the "dedicated E-RGCH". However, it is not possible to reconfigure the E-RGCH in the current specification as the Node B must instead use the "common" E-RGCH.

The first and third problems discussed above are particularly critical problems. The exemplary embodiments of this invention address the first and third problems, as well as the other problems enumerated above.

It is noted that these and similar issues can arise for the E-AGCH/HICH, as the same channelization code and E-RNTI for the E-AGCH in the serving cell are to be used until the serving cell becomes the non-serving cell, or the E-DCH is released. The same channelization code and signature sequence for the E-HICH are to be used until the E-DCH is released. The reconfiguration of code and signature sequence for E-AGCH and E-HICH is required for a system that implements VoIP over HSUPA, since it may be expected that, for example, 100 UEs are in the cell and the reconfiguration could result in the benefits of saving the code and signature resources. In general, the term radio resources as used herein includes channelization codes, signature sequences, temporary network identifiers, and other parameters (channel configuration parameters or network identifiers for UE) for a radio link (e.g., the E-RGCH or E-HICH) between a UE and a Node B (or a RNC).

The exemplary embodiments of this invention relate generally to HSUPA and to enhancements to the uplink DCH (E-DCH) for packet data traffic. The exemplary embodiments of this invention may be used in, as a non-limiting example, Release 6 of 3GPP.

Figure 1:
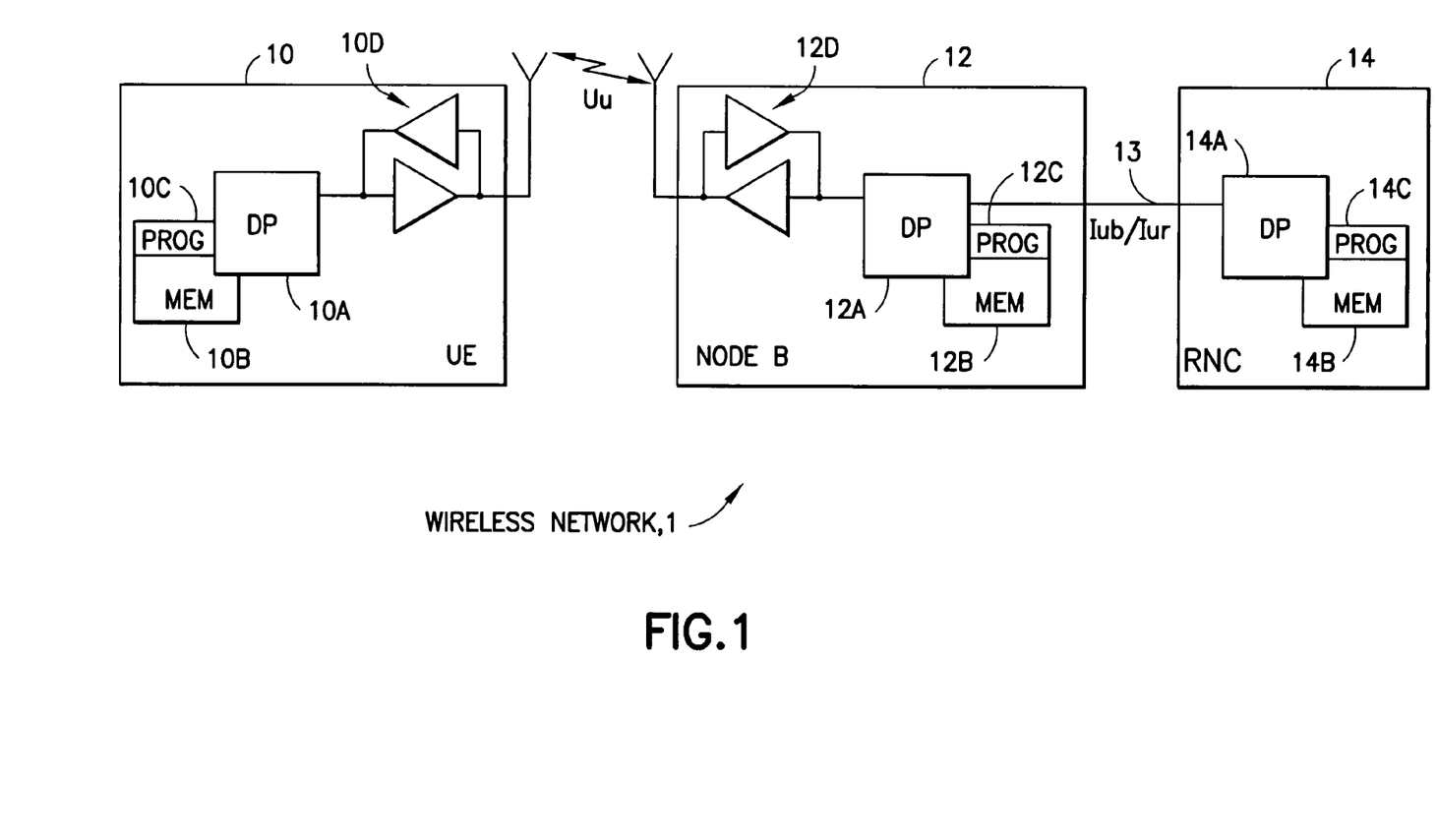
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 includes a UE 10, a Node B (base station) 12 and a RNC 14 (the RNC 14 may be referred to below as the SRNC 14). The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 (Iub/Iur interfaces) to the RNC 14 that also includes a DP 14A and a MEM 14B storing an associated PROG 14C. The PROGs 12C and 14C are assumed to include program instructions that, when executed by the associated DP, enable the electronic device to operate in accordance with the exemplary embodiments of this invention, as will be discussed below in greater detail. Note that the implementation of the exemplary embodiments of this invention can be accomplished without requiring a change to the PROG 10C of the UE 10.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 12A of the Node B 12 and the DP 14A of the RNC 14, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

The use of the exemplary embodiments of this invention enable the release, configuration and reconfiguration of the E-RGCH/HICH at a serving cell change and, more generally, at any desired time.

Discussed first are exemplary embodiments (A)-(D) for releasing the E-RGCH resource at a serving cell change.

A) The Node B 12 indicates to the SRNC 14 whether the E-RGCH is released or is not released (e.g., an E-RGCH release indicator) each time the serving E-DCH RL change is executed (the cell is changed from the serving cell to the non-serving cell or vice versa).

B) The Node B 12 indicates to the SRNC 14 that the E-RGCH is released (e.g., an E-RGCH release indicator) when the serving E-DCH RL change is executed. It should be noted that if the Node B 12 does not release the E-RGCH, then the Node B 12 does not need to indicate at all to the SRNC 14.

C) The Node B 12 indicates to the SRNC 14 one of the following three items each time the serving E-DCH RL change is executed:
    a. E-RGCH is reconfigured and the new configuration parameters (e.g., channelization code and signature sequence) for the reconfigured E-RGCH;
    b. E-RGCH is maintained (e.g., a negative release indicator); or
    c. E-RGCH is released (e.g., a positive release indicator).

D) The Node B 12 indicates, at any time, to the SRNC 14 that the Node B desires to release the current E-RGCH, including at a time when the E-DCH RL change is executed.

It can be noted that there are no cases seen where the E-HICH is released and the E-AGCH is released in the serving cell.

After the reception of the request for the release from the Node B 12 at the SRNC 14, the SRNC 14 sends the UE 10 the request to release.

Discussed now are exemplary embodiments (A) and (B) for configuring and reconfiguring the E-RGCH/E-HICH resource at a serving cell change.

A) The Node B 12 indicates to the SRNC 14 whether or not the E-RGCH/E-HICH is configured (and reconfigured) each time that the serving E-DCH RL change is executed. In addition, configuration parameters (e.g., channelization code and signature sequence) for the E-RGCH/E-HICH are sent to the SRNC 14 when the Node B 12 indicates that the E-RGCH/HICH is configured or reconfigured.

B) The Node B 12 indicates to the SRNC 14 that the Node B 12 desires to configure/reconfigure the E-RGCH/E-HICH/E-AGCH at anytime (including a time when the E-DCH RL change is executed). It can be noted that the reconfiguration of the E-AGCH is only made possible by the use of this embodiment.

After the reception of the request for the configuration/reconfiguration from the Node B 12 at the SRNC 14, the SRNC 14 sends UE 10 the request to configure/reconfigure.

With regard to exemplary implementations of the foregoing, in particular the releasing of the E-RGCH at the serving cell change in embodiment (A), a new IE may be defined (for example, one referred to as "E-RGCH Release Indicator"), which indicates to the SRNC 14 whether or not the E-RGCH is released. This IE can be placed in a Response message (e.g., RNSAP/NBAP: RADIO LINK RECONFIGURATION READY and RADIO LINK RECONFIGURATION RESPONSE) for the message requests to execute the serving cell change. The new IE is preferably also introduced in a RRC message (as one non-limiting example, in a PHYSICAL CHANNEL RECONFIGURATION message) for informing the UE 10.

Figures 2, 2A:
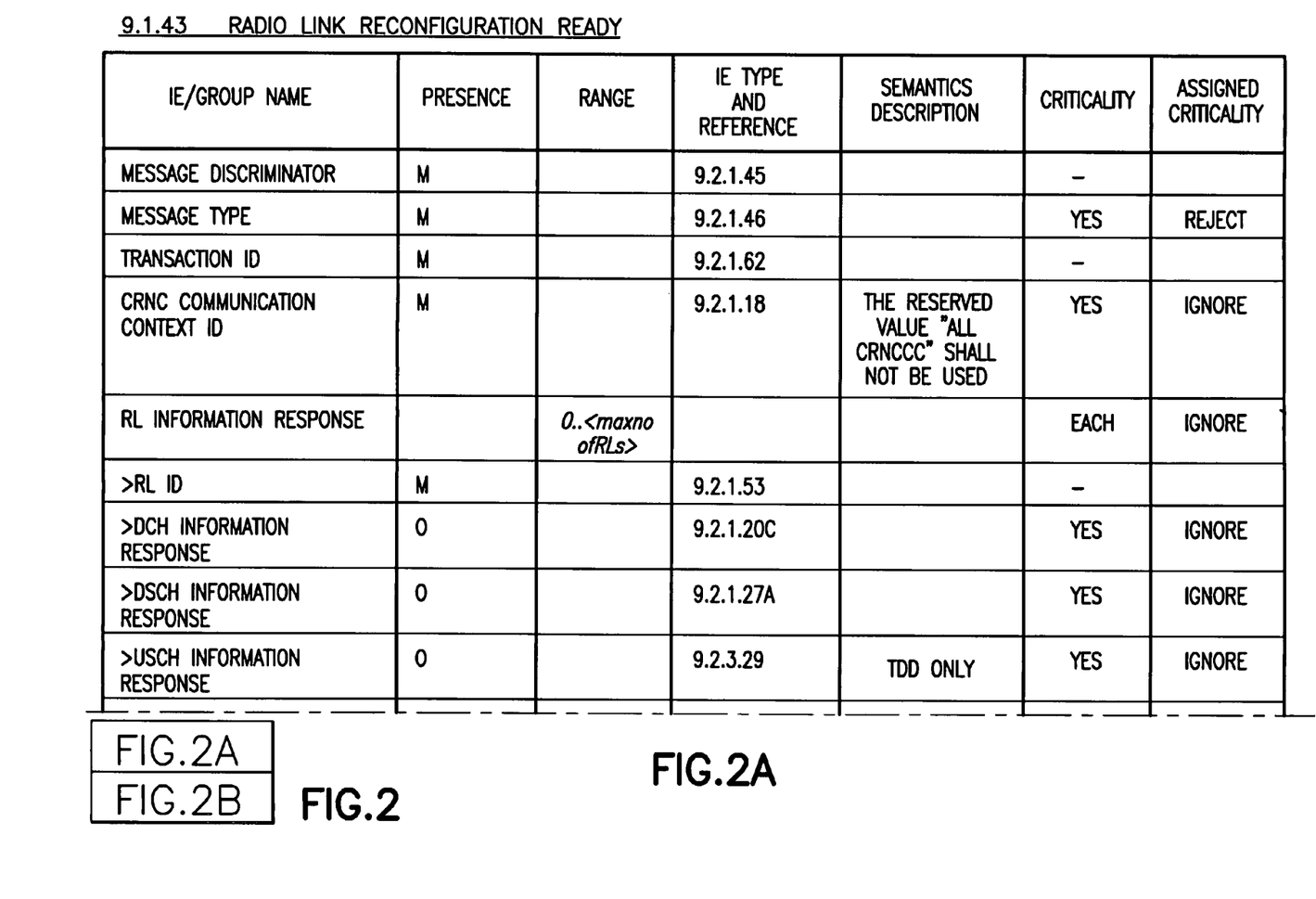
FIG. 2 shows an example of the use of an E-RGCH Release Indicator IE according to an embodiment of the invention in the context of Table 9.1.43 (page 212) of 3GPP TS 25.433 V6.6.0 (2005-06), Radio Link Reconfiguration Ready message that is sent from the Node B to the SRNC.
Figure 2B:
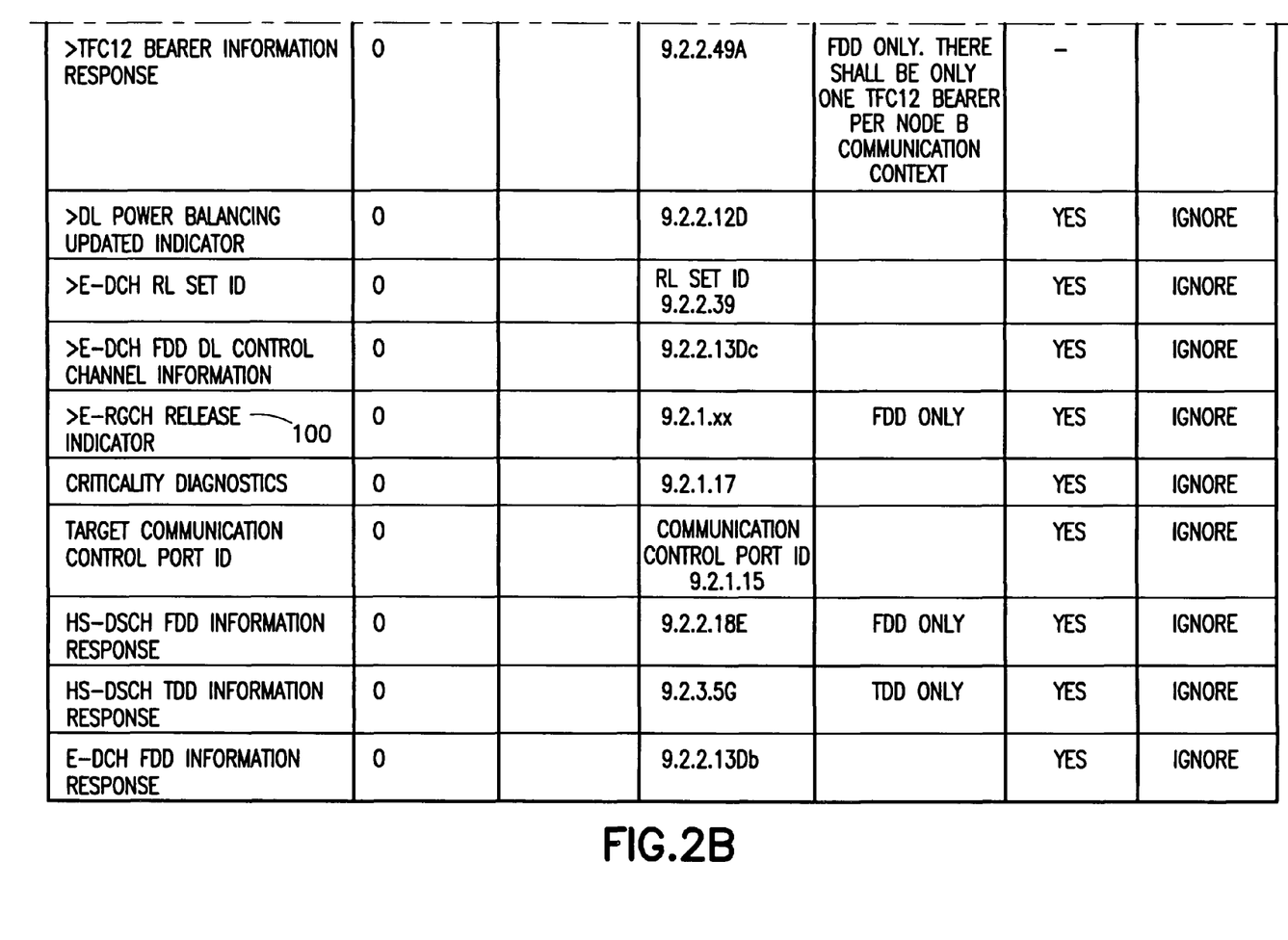

An example of the use of the E-RGCH Release Indicator IE (designated as 100) is shown in FIG. 2, in the context of Table 9.1.43 (page 212) of 3GPP TS 25.433 V6.6.0 (2005-06); 3rd Generation Partnership Project; Technical Specification Group Radio Access Network; UTRAN Iub Interface Node B Application Part (NBAP) signaling (Release 6).

Figure 3:
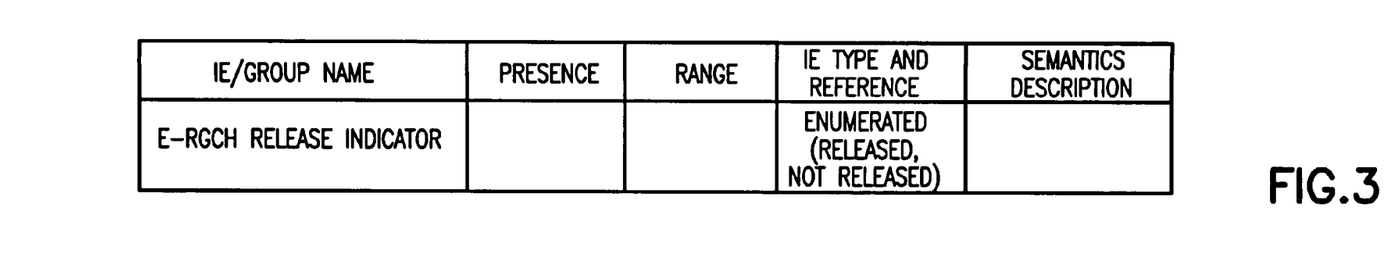
FIG. 3 shows an exemplary embodiment of the IE/Group Name and IE Type and Reference for the E-RGCH Release Indicator of FIG. 2.

FIG. 3 shows an exemplary embodiment of the IE/Group Name and IE Type and Reference for the E-RGCH Release Indicator.

With regard to exemplary implementations of the embodiment (B) for releasing the E-RGCH resource at a serving cell change discussed above, a new IE which indicates that the E-RGCH is released can be introduced in the Response message (e.g., RNSAP/NBAP: RADIO LINK RECONFIGURATION READY and RADIO LINK RECONFIGURATION RESPONSE) for the message requests to execute serving cell change. The new IE is preferably also introduced in a RRC message (as one non-limiting example, in a PHYSICAL CHANNEL RECONFIGURATION message) for informing the UE 10.

With regard to exemplary implementations of the embodiment (C) for releasing the E-RGCH resource at a serving cell change discussed above, a new IE to indicate one of the following:

a. E-RGCH is configured or reconfigured;

b. E-RGCH is maintained; or c. E-RGCH is released may be introduced in the Response message (e.g., RNSAP/NBAP: RADIO LINK RECONFIGURATION READY and RADIO LINK RECONFIGURATION RESPONSE) for the message requests to execute the serving cell change. This new IE also preferably includes the IE that carries the configuration parameters (e.g., channelization code and E-RGCH Signature Sequence IE) for the reconfigured E-RGCH, or the existing E-DCH FDD DL Control Channel Information IE may carry the configuration parameters. The new IE is preferably also introduced in a RRC message (as one non-limiting example, in a PHYSICAL CHANNEL RECONFIGURATION message) for informing the UE 10.

With regard to exemplary implementations of the embodiment (D) for releasing the E-RGCH resource at a serving cell change discussed above, a new IE may be introduced to indicate that the Node B 12 desires to release the E-RGCH. This IE can be placed in an existing NBAP/RNSAP RADIO LINK PARAMETER UPDATE message, or in a new RNSAP/NBAP message. The NBAP/RNSAP RADIO LINK PARAMETER UPDATE message is found at section 8.3.19 (page 140) of TS25.433, v6.6.0. For replying to the Node B 12, another new IE may be introduced to indicate a SRNC 14 request to the Node B 12 to release the E-RGCH. This new IE may be introduced in an existing RNSAP/NBAP RADIO LINK RECONFIGURATION PREPARATION/REQUEST message specified in Tables 9.1.42 and 9.1.47 of TS25.433, v6.6.0. The new IE is preferably also introduced in a RRC message (as one non-limiting example, in a PHYSICAL CHANNEL RECONFIGURATION message) for informing the UE 10.

With regard to exemplary implementations of the embodiment (A) for (re)configuring E-RGCH/HICH at serving cell change discussed above, a new IE, similar to that discussed above for embodiments A and C, can be used. The configuration parameters for E-RGCH/HICH configured/reconfigured may be carried in a new IE, or in the existing E-DCH FDD DL Control Channel Information.

With regard to exemplary implementations of the embodiment (B) for (re)configuring E-RGCH/HICH at serving cell change discussed above, a new IE, similar to that discussed above for embodiment D, can be used.

The use of the non-limiting and exemplary embodiments of this invention enable the release of unnecessary E-RGCH resources when the E-DCH RL Serving cell change is executed, and thus avoid wasting these resources. The use of the non-limiting and exemplary embodiments of this invention further enable the configuration or reconfiguration of necessary E-RGCH resources when an E-DCH RL Serving cell change is executed, and enable the Node B 12 to continue to use the E-RGCH. Further, no new procedures or messages need to be introduced in the RNSAP/NBAP signaling, as only one or more new IEs in existing messages need to be introduced in the specification (such as the E-RGCH Release Indicator IE that was discussed above and shown in FIGS. 2 and 3).

Figure 4:
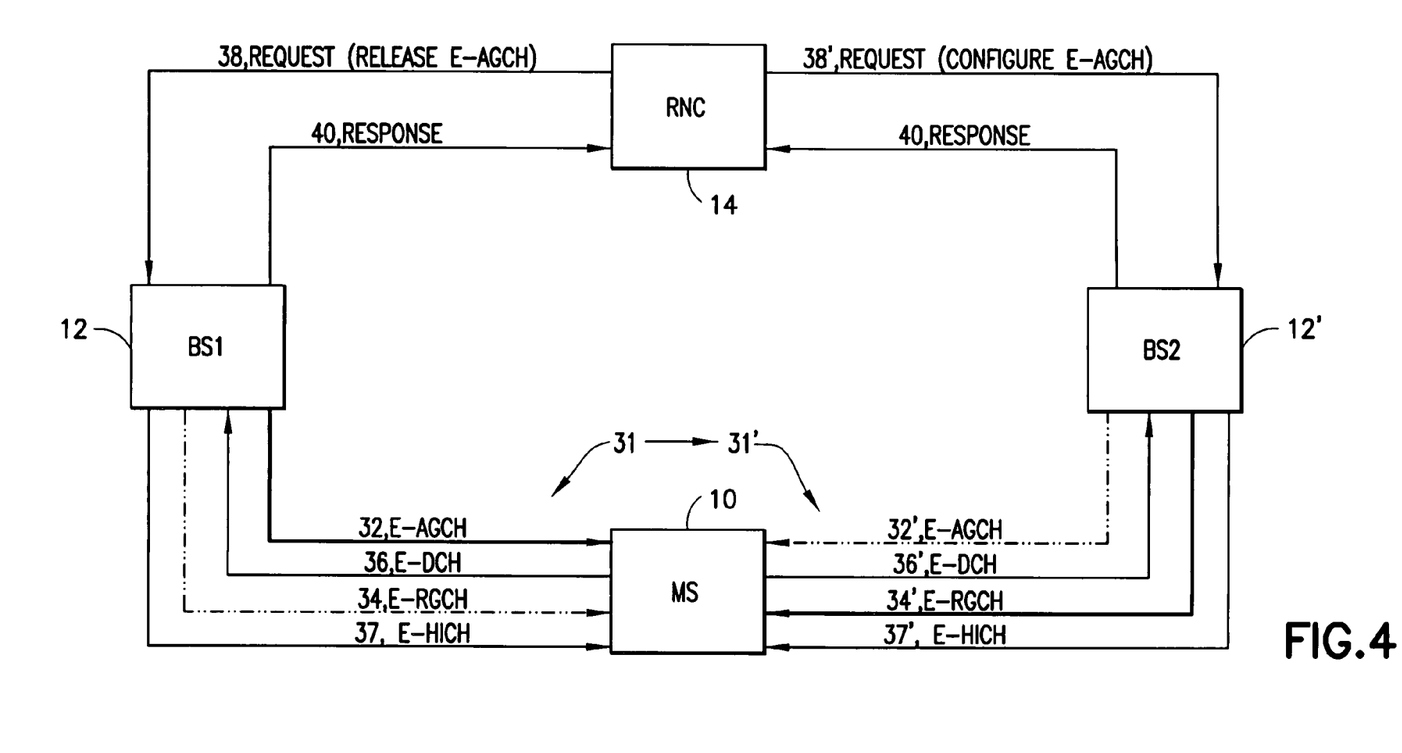
FIG. 4 is a schematic diagram of a mobile station undergoing a cell change and implementing an embodiment of the invention.

FIG. 4 illustrates in a schematic diagram operation of an exemplary embodiment by the various nodes involved. The RNC 14 is as previously described. The Node B is represented by a first base station BS1 12 (e.g., the serving Node B to the MS prior to the serving cell change) and a second base station BS2 12' (e.g., the non-serving Node B prior to the serving cell change). Where the two base stations BS1 12 and BS2 12' represent different node B's, they may be under the control of a single RNC (serving RNC) or may be under control of different RNCs. A mobile station MS 10 moves from a first location 31 where it is under the control of the first BS1 12 to a second location 31' where it is under the control of the second BS2 12', representing a serving cell change for the MS 10. Embodiments of this invention are not limited to serving cell changes, though that is a convenient occurrence to initiate the release, configuration, and/or reconfiguration of radio resources as described herein.

Assume for FIG. 4 that a dedicated channel E-DCH is set up by the serving BS1 12 for the MS 10 prior to the serving cell change (though the MS 10 with the E-DCH already established may have previously been changed to the first BS1 12). The first BS1 12 configures for the MS 10 (while it is the serving Node B) an absolute grant channel E-AGCH 32 and a relative grant channel E-RGCH 34, which respectively set an absolute ceiling on data rate and power that the UE is allowed to use on the E-DCH, and a relative adjustment/increment to that ceiling that may be commanded to the UE from time to time by BS1 12 based on changing conditions in the cell. Also shown in FIG. 4 is the downlink E-HICH 37, 37', which the BS 12 uses to prompt the MS 10 to re-send data that was not properly received at the BS 12. Each of the E-AGCH, E-RGCH and E-HICH use radio resources, such as an enhanced radio network temporary identifier E-RNTI, channelization codes and/or signature sequences for those downlink channels, and the like, and such resources are limited for any particular base station. The SRNC 14 informs the MS 10 of these downlink configuration parameters (e.g., signature sequence, channelization codes, E-RNTI assigned to the MS 10 to identify it on these downlink channels) received from the BS 12 in order that the MS 10 can store the parameters and monitor those downlink channels. Each of those downlink channels are used in support of the E-DCH and may be considered to schedule the E-DCH, which is dedicated to the MS 10 for uplink data. Typically, these downlink parameters as well as those for the uplink E-DCH are sent to the MS 10 in one or more Physical Channel Configuration messages, as known in the art, though the manner in which the initial setup of an E-DCH may vary. These teachings are directed toward the downlink channels associated with and in support of the uplink E-DCH, and related aspects of those downlink channels.

Now the MS 10 moves to a second position 31', and the second BS2 12' becomes the serving Node B following the serving cell change, and the E-DCH 36 for the MS 10 is maintained through the serving cell change. A serving cell change may be accomplished in any number of ways known in the art, and may include coordinating between the first Node B BS1 12 and the second Node B BS2 12'. The specific instance illustrated in FIG. 4 finds the RNC 14 releasing the E-AGCH used by the first Node B BS1 12 and configuring a new E-AGCH for the second Node B BS2 12', which may be done to change a E-AGCH for the same MS 10 when that MS undergoes a serving cell change from the first BS1 12 to the second BS2 12' Specifically, the SRNC 14 sends a request 38 to the first Node B BS1 12 to release the E-AGCH, and also sends a request 38' to the second Node B BS2 12' to configure a new E-AGCH. Each of those Node Bs respond 40 as appropriate. In an embodiment, the requests 38, 38' may be a radio link reconfiguration prepare message, and the response 40 is a radio link reconfiguration ready message with the newly introduced E-RGCH release indicator as noted above with respect to FIGS. 2-3. The E-RGCH release indicator or similar information element may also be included in a physical channel reconfiguration message sent to the UE. While FIG. 4 illustrates releasing the E-AGCH in one cell and configuring a new one in another cell, the E-RGCH can also be reconfigured with similar signaling between the BS.12, 12' and the MS 10, in some embodiments also informing the SRNC 14 of any changes made to release, configure, or reconfigure the E-AGCH and/or the E-HICH, shown particularly at FIGS. 5-6. In the prior art, the second Node B that becomes the serving Node B would have to use the E-AGCH and E-RGCH that was used in the Node B that was serving prior to the serving cell change because there was no provision to release, change, or add any of those downlink channels after the E-DCH was setup; changes could only be made by terminating the E-DCH. Given that the radio resources used for that channel E-RGCH are limited, the E-RNTI, signature sequence or channelization codes allocated upon setup of the E-DCH may not be optimal for the second Node B (BS2 12'), which may use more or less downlink channel that supports the E-DCH (E-AGCH, E-HICH, E-AGCH) than the first Node B (BS1 12).

For a change to the E-AGCH, the SRNC 14 informs the MS 10, such as in a Physical Channel Reconfiguration message, that the first E-AGCH 32 is released and a second E-AGCH 32' is to be used. Upon receipt of this reconfiguration message, the MS 10 deletes its previously stored parameters for the first E-AGCH 32 and stores those received either of the Node B's (BS1 12, BS2 12') for the second E-AGCH 32'. Similar changes may be made to the E-RGCH and the E-HICH, though those changes are typically initiated by the Node Bs rather than the SRNC 14. The physical channel reconfiguration message sent to the MS 10 may include a field such as the E-RGCH release indicator illustrated in FIGS. 2-3 that informs the MS 10 that the previous E-RGCH 34 is released, as well as new parameters for the new E-RGCH 34'. Since the MS 10 then no longer has need for the parameters (channelization coding and signature sequence) for the now-released E-RGCH 34 that was used with the first Node B BS1 12, it deletes those parameters from any local memory in which they are stored. The radio resources for the now-released E-RGCH 34 may then be re-allocated by the network (the first Node B, BS1 in FIG. 4) for other uses.

The two different Node B's 12, 12' may be under the control of different RNCs without departing from these teachings. Where the serving cell change uses soft techniques in which the cells 12, 12' coordinate among each other prior to control of the MS 10 actually being changed, signaling as detailed above may be done by the non-serving Node B BS1 12, the serving Node B BS2 12', or by some combination of them so that the eventual release, configuration, or reconfiguration of the E-RGCH takes place upon the serving cell change or soon before or after control passes. These same procedures apply equally to reconfiguring the E-HICH, where the MS 10 sends its automatic repeat requests on the reconfigured E-HICH 37' and the original E-HICH 37 that was set up with the E-DCH 36 is released so that the first Node B BS1 12 might use those now-released radio resources for other purposes.

Figure 5:
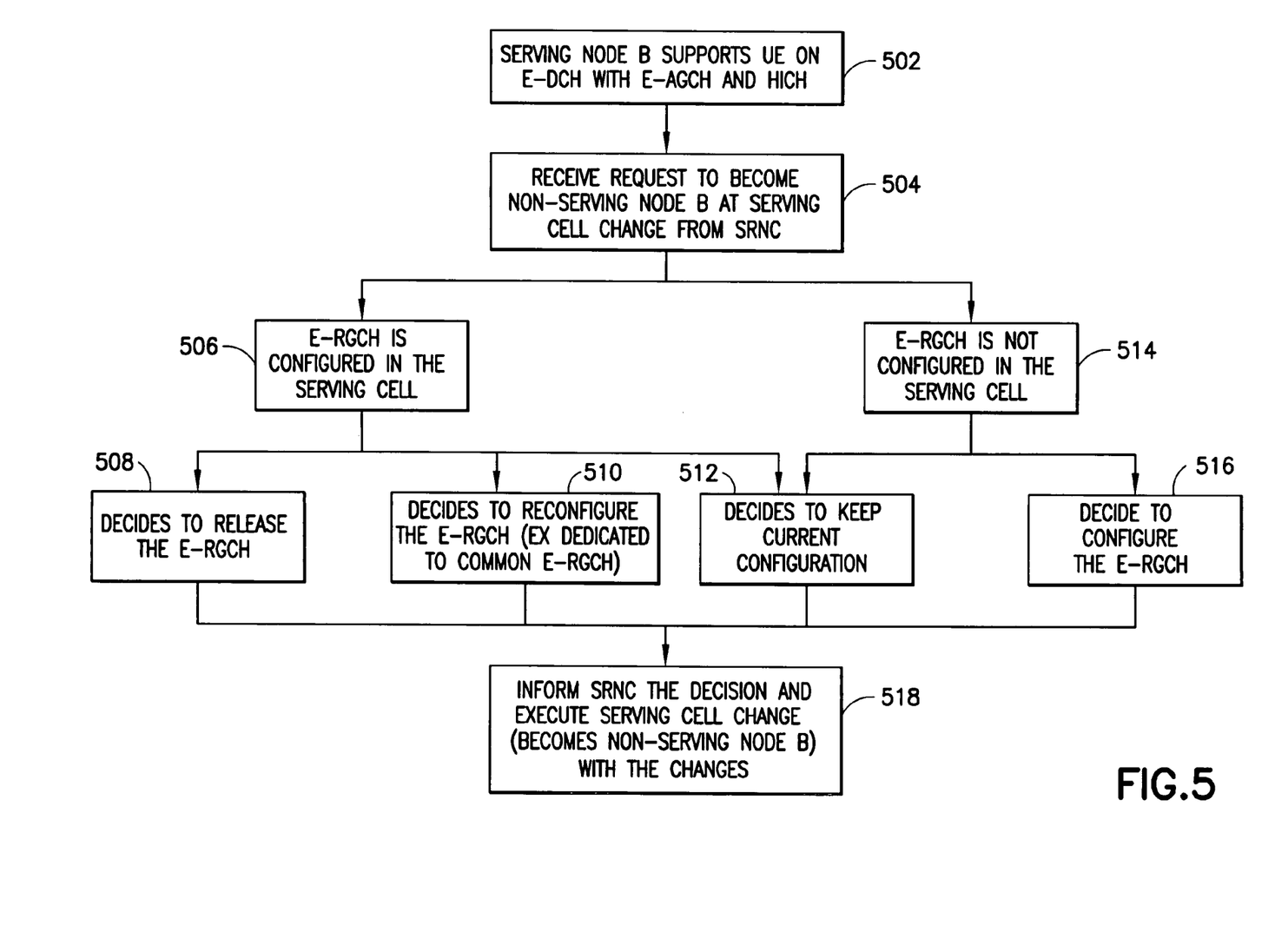
FIG. 5 is a process flow diagram illustrating steps executed by a serving Node B that becomes a non-serving Node B to release, configure or reconfigure various channels in support of an E-DCH, according to certain embodiments of the invention.

FIG. 5 illustrates a process diagram for various exemplary embodiments of the invention. As stated above, there are instances where the Node B that becomes the non-serving Node B from serving Node B. As an initial starting position at block 502, assume that the MS 10 is under control of a serving Node B that becomes a non-serving Node B after a serving cell change. The E-DCH is supported by at least the E-AGCH and the E-HICH; alternatives for the E-RGCH are detailed below. The serving cell change is initiated at block 504 when the serving Node B receives a request (from the SRNC) for a serving cell change. For the case 506 where the E-RGCH is already configured, the serving Node B may decide to release the E-RGCH 508, reconfigure the E-RGCH 510 such as from dedicated to common, or retain the current configuration of the E-RGCH unchanged 512. For the case 514 where the E-RGCH is not configured prior to the serving cell change, the serving Node B may decide to retain the current configuration of the E-RGCH unchanged 512 or to configure an E-RGCH 516. At block 518 the SRNC 14 is informed of the decision, and the serving cell change is then executed where the serving Node B described in FIG. 5 becomes the non-serving Node B.

Figure 6:
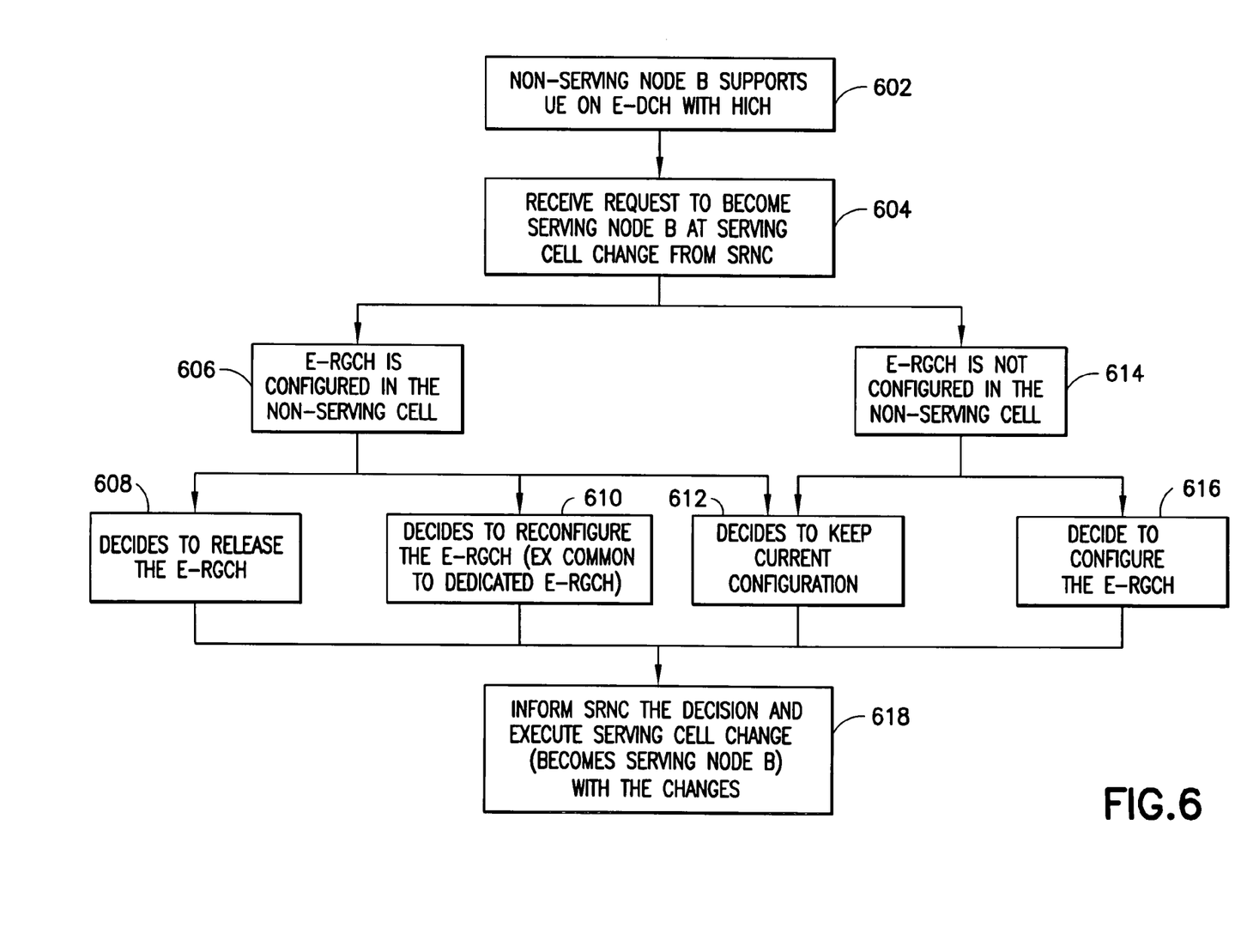
FIG. 6 is a process flow diagram illustrating steps executed by a non-serving Node B that becomes a serving Node B to release, configure or reconfigure (as appropriate) various channels in support of an E-DCH, according to certain embodiments of the invention.

FIG. 6 illustrates process steps in accordance with exemplary embodiments of the invention where the downlink channel E-RGCH that support the uplink E-DCH is either released or reconfigured (or kept unchanged) while the E-DCH is maintained for the MS 10. FIG. 6 is the complement to FIG. 5, in that FIG. 6 illustrates what may occur at the non-serving Node B that becomes the serving Node B after the serving cell change. As an initial starting point for FIG. 6, block 602 shows that the non-serving Node B supports the MS 10 (user equipment UE) uplink E-DCH with the downlink E-HICH. At some point the non-serving Node B receives a request 604 from the SRNC to become a serving Node B to the UE. For the case 606 where the E-RGCH is already configured prior to the serving cell change, the non-serving Node B may decide to release the E-RGCH 608, reconfigure the E-RGCH 610 such as from common to dedicated, or to retain the current configuration of the E-RGCH unchanged 612. For the case 614 where the E-RGCH is not configured prior to the serving cell change, the non-serving Node B may decide to retain the current configuration of the E-RGCH unchanged 612 or to configure a new E-RGCH 616. At block 618 the SRNC 14 is informed of the decision, and the serving cell change is then executed where the non-serving Node B described in FIG. 6 then becomes the serving Node B.

Note that the actions of FIG. 5 may be coordinated with the actions of FIG. 6 for a smoother serving cell change, but they need not be. For example, the FIG. 6 non-serving Node B that becomes the serving Node B may not have the E-RGCH, and decide to configure a new one. The FIG. 5 serving Node B that becomes the non-serving Node B may not know until after the serving cell change occurs that the E-RGCH it was using previously is no longer needed, and only then release it. Many other such variances are possible because FIGS. 5 and 6 are not necessarily linked, though in some embodiments the actions of the serving and non-serving Node Bs are coordinated for efficient deployment of radio resources without delay. As such, the release/configuration/reconfiguration of the described channels described as taking place at a serving cell change need not occur exactly simultaneous with the instant when control over the UE changes, but may occur soon before or after that control change occurs and still be "at a serving cell change".

Based on the foregoing it should be apparent that the exemplary embodiments of this invention provide a method, apparatus and computer program product(s) to provide enhanced Node B/RNC signaling that enables the release of unnecessary E-RGCH resources (advantageously when the E-DCH RL Serving cell change is executed), and to further enable the configuration and reconfiguration of E-RGCH/HICH resources (in certain embodiments when an E-DCH RL Serving cell change is executed).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
receiving communications from a user equipment on an uplink enhanced dedicated channel;
one of releasing or configuring or reconfiguring radio resources of at least one downlink channel that supports the uplink enhanced dedicated channel at a serving cell change while the uplink enhanced dedicated channel is maintained for the user equipment; and at least one of:
signaling to a serving radio network controller in at least one of a RADIO LINK RECONFIGURATION READY message and a RADIO LINK RECONFIGURATION RESPONSE message that an enhanced relative grant channel is one of configured or reconfigured, said at least one of the READY and RESPONSE message comprising an E-DCH FDD DL CONTROL CHANNEL INFORMATION information element, where E-DCH stands for uplink enhanced dedicated channel, where FDD stands for frequency division duplex, and where DL stands for downlink.

2. The method of claim 1, executed by a Node B that changes from a serving Node B to a non-serving Node B at a serving cell change, wherein one of releasing or configuring or reconfiguring the radio resources comprises configuring a new enhanced relative grant channel.

3. The method of claim 1, executed by a Node B that changes from a non-serving Node B to a serving Node B at a serving cell change, wherein one of releasing or configuring or reconfiguring the radio resources comprises configuring a new enhanced relative grant channel.

4. The method of claim 1, executed by a Node B at a serving cell change, wherein one of releasing or configuring or reconfiguring the radio resources comprises reconfiguring the enhanced relative grant channel.

5. The method of claim 4, wherein the Node B reconfigures the enhanced relative grant channel from a dedicated enhanced relative grant channel to a common enhanced relative grant channel.

6. The method of claim 4, wherein the Node B reconfigures the enhanced relative grant channel from a common enhanced relative grant channel to a dedicated enhanced relative grant channel.

7. The method of claim 1, executed by a Node B that changes from a serving Node B to a non-serving Node B at a serving cell change, wherein one of releasing or configuring or reconfiguring the radio resources comprises releasing the enhanced relative grant channel.

8. The method of claim 1, executed by a Node B that changes from a non-serving Node B to a serving Node B at a serving cell change, wherein one of releasing or configuring or reconfiguring the radio resources comprises releasing the enhanced relative grant channel.

9. The method of claim 1, further comprising for the case where the enhanced relative grant channel is released:
signaling to the user equipment a radio resource control message comprising an E-RGCH RELEASE INDICATOR information element that directs the user equipment to delete a stored configuration for the enhanced relative grant channel.

10. The method of claim 1, executed at a serving cell change by a Node B that changes from a serving Node B to a non-serving Node B, wherein one of releasing or configuring or reconfiguring the radio resources comprises configuring or reconfiguring at least one of an enhanced absolute grant channel, an enhanced relative grant channel, and an enhanced hybrid acknowledgement indicator channel, the method further comprising:
the Node B signaling to the serving radio network controller a request to configure or reconfigure the at least one of the enhanced absolute grant channel, enhanced relative grant channel and enhanced hybrid acknowledgement indicator channel.

11. The method of claim 1, wherein the radio resources comprise at least one of an enhanced radio network temporary identifier, a signature sequence, a channelization code, and a channel configuration parameter.

12. A memory embodying a program of machine-readable instructions, executable by a digital data processor, to perform actions directed toward reconfiguring control of a channel, the actions comprising:
receiving communications from a user equipment on an uplink enhanced dedicated channel;
one of releasing or configuring or reconfiguring radio resources of at least one downlink channel that supports the uplink enhanced dedicated channel at a serving cell change while the uplink enhanced dedicated channel is maintained for the user equipment; and
signaling to a serving radio network controller at least one of a RADIO LINK RECONFIGURATION READY message and a RADIO LINK RECONFIGURATION RESPONSE message that an enhanced relative grant channel is one of configured or reconfigured, said at least one of the READY and RESPONSE message comprising an E-DCH FDD DL CONTROL CHANNEL INFORMATION information element, where E-DCH stands for enhanced dedicated channel, where FDD stands for frequency division duplex, and where DL stands for downlink.

13. The memory of claim 12, wherein the memory and the processor are disposed within a base station that changes from a serving Node B to a non-serving Node B at a serving cell change of the user equipment, wherein one of releasing or configuring or reconfiguring the radio resources comprises configuring a new enhanced relative grant channel.

14. The memory of claim 12, wherein the memory and the processor are disposed within a base station that changes from a non-serving Node B to a serving Node B at a serving cell change of the user equipment, wherein one of releasing or configuring or reconfiguring the radio resources comprises configuring a new enhanced relative grant channel.

15. The memory of claim 12, wherein the memory and the processor are disposed within a base station that changes between a non-serving Node B and a serving Node B at a serving cell change of the user equipment, wherein one of releasing or configuring or reconfiguring the radio resources comprises reconfiguring the enhanced relative grant channel.

16. The memory of claim 15, wherein reconfiguring the enhanced relative grant channel comprises reconfiguring it from a dedicated enhanced relative grant channel to a common enhanced relative grant channel.

17. The memory of claim 15, wherein reconfiguring the enhanced relative grant channel comprises reconfiguring it from a common enhanced relative grant channel to a dedicated enhanced relative grant channel.

18. The memory of claim 12, wherein the memory and the processor are disposed within a base station that changes from a serving Node B to a non-serving Node B at a serving cell change of the user equipment, wherein one of releasing or configuring or reconfiguring the radio resources comprises releasing the enhanced relative grant channel.

19. The memory of claim 12, wherein the memory and the processor are disposed within a base station that changes from a non-serving Node B to a serving Node B at a serving cell change of the user equipment, wherein one of releasing or configuring or reconfiguring the radio resources comprises releasing the enhanced relative grant channel.

20. The memory of claim 12, the actions further comprising, for the case where the enhanced relative grant channel is released:
signaling to the user equipment a radio resource control message comprising an E-RGCH RELEASE INDICATOR information element that directs the user equipment to delete a stored configuration for the enhanced relative grant channel.

21. A network element comprising:
a transceiver;
a memory;
a data processor coupled to the memory and the transceiver;
wherein the data processor operates to
at a serving cell change, one of release, configure, or re-configure radio resources of at least one downlink channel that supports an enhanced dedicated traffic channel for a user equipment without terminating the enhanced dedicated traffic channel; and
signal the releasing, configuring, or reconfiguring of the radio resources to one of a higher network element or the user equipment, wherein the signal comprises at least one of a
RADIO LINK RECONFIGURATION READY and a RADIO LINK RECONFIGURATION RESPONSE message sent to a serving radio network controller, said at least one READY and RESPONSE message comprising an E-RGCH RELEASE INDICATOR information element to indicate that an enhanced relative grant channel is released, where E-RGCH stands for enhanced relative grant channel.

22. The network element of claim 21, wherein the network element comprises a base station that changes from a serving Node B to a non-serving Node B at a serving cell change of the user equipment, wherein one of release, configure, or re-configure the radio resources comprises configuring a new enhanced relative grant channel.

23. The network element of claim 21, wherein the network element comprises a base station that changes from a non-serving Node B to a serving Node B at a serving cell change of the user equipment, wherein one of release, configure, or re-configure the radio resources comprises configuring a new enhanced relative grant channel.

24. The network element of claim 21, wherein the network element comprises a base station that changes between a non-serving Node B and a serving Node B at a serving cell change of the user equipment, wherein one of release, configure, or re-configure the radio resources comprises reconfiguring an enhanced relative grant channel.

25. The network element of claim 24, wherein reconfiguring the enhanced relative grant channel comprises reconfiguring it from a dedicated enhanced relative grant channel to a common enhanced relative grant channel.

26. The network element of claim 24, wherein reconfiguring the enhanced relative grant channel comprises reconfiguring it from a common enhanced relative grant channel to a dedicated enhanced relative grant channel.

27. The network element of claim 21, wherein the network element comprises a base station that changes from a serving Node B to a non-serving Node B at a serving cell change of the user equipment, wherein one of release, configure, or re-configure the radio resources comprises releasing the enhanced relative grant channel.

28. The network element of claim 21, wherein the network element comprises a base station that changes from a non-serving Node B to a serving Node B at a serving cell change of the user equipment, wherein one of release, configure, or re-configure the radio resources comprises releasing a new enhanced relative grant channel.

29. The network element of claim 21, wherein the signal comprises, for the case where the enhanced relative grant channel is released:
   a radio resource control message sent to the user equipment comprising an E-RGCH RELEASE INDICATOR information element that directs the user equipment to delete a stored configuration for the enhanced relative grant channel.

30. A method comprising
   receiving communications from a user equipment on an uplink enhanced dedicated channel;
   one of releasing or configuring or reconfiguring radio resources of at least one downlink channel that supports the uplink enhanced dedicated channel at a serving cell change while the uplink enhanced dedicated channel is maintained for the user equipment; and
   signaling to a serving radio network controller in at least one of a RADIO LINK RECONFIGURATION READY message and a RADIO LINK RECONFIGURATION RESPONSE message that an enhanced relative grant channel is released, said at least one READY and RESPONSE message comprising an E-RGCH RELEASE INDICATOR information element, where E-RGCH stands for enhanced relative grant channel.

31. A memory embodying a program of machine-readable instructions, executable by a digital data processor, to perform actions directed toward reconfiguring control of a channel, the actions comprising:
   receiving communications from a user equipment on an uplink enhanced dedicated channel;
   one of releasing or configuring or reconfiguring radio resources of at least one downlink channel that supports the uplink enhanced dedicated channel at a serving cell change while the uplink enhanced dedicated channel is maintained for the user equipment, wherein the memory and the processor are disposed within a base station that changes from a serving Node B to a non-serving Node B at a serving cell change of the user equipment, wherein one of releasing or configuring or reconfiguring the radio resources comprises configuring a new enhanced relative grant channel; and
   signaling to a serving radio network controller at least one of a RADIO LINK RECONFIGURATION READY message and a RADIO LINK RECONFIGURATION RESPONSE message that the enhanced relative grant channel is released, said at least one READY and RESPONSE message comprising an E-RGCH RELEASE INDICATOR information element, where E-RGCH stands for enhanced relative grant channel.

32. A network element comprising:
   a transceiver;
   a memory;
   a data processor coupled to the memory and the transceiver;
   wherein the data processor operates to
      at a serving cell change, one of release, configure, or re-configure radio resources of at least one downlink channel that supports an enhanced dedicated traffic channel for a user equipment without terminating the enhanced dedicated traffic channel; and
      signal the releasing, configuring, or reconfiguring of the radio resources to one of a higher network element or the user equipment, wherein the signal further comprises at least one of a
   RADIO LINK RECONFIGURATION READY and a RADIO LINK RECONFIGURATION RESPONSE message sent to a serving radio network controller, said at least one READY and RESPONSE message comprising an E-DCH FDD DL CONTROL CHANNEL INFORMATION information element to indicate that an enhanced relative grant channel is one of configured or re-configured, where E-DCH stands for enhanced dedicated channel, where FDD stands for frequency division duplex, and where DL stands for downlink.

* * * * *